(12) United States Patent
Lin

(10) Patent No.: US 12,368,990 B2
(45) Date of Patent: Jul. 22, 2025

(54) TELESCOPIC STRUCTURE OF HEADPHONE

(71) Applicant: Cheng Uei Precision Industry Co., LTD., New Taipei (TW)

(72) Inventor: Chin-Chung Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 199 days.

(21) Appl. No.: 18/367,457

(22) Filed: Sep. 12, 2023

(65) Prior Publication Data

US 2024/0179445 A1      May 30, 2024

(30) Foreign Application Priority Data

Nov. 25, 2022   (CN) .......................... 202223136504.5

(51) Int. Cl.
*H04R 5/033*      (2006.01)
*H04R 1/10*       (2006.01)

(52) U.S. Cl.
CPC ........... *H04R 1/105* (2013.01); *H04R 1/1033* (2013.01); *H04R 1/1058* (2013.01)

(58) Field of Classification Search
CPC ...... H04R 1/1008; H04R 1/1033; H04R 1/10; H04R 5/0335; H04R 1/105; H04R 1/1058; H04R 1/1066; H04R 5/033; H04R 2201/10; H04R 2201/105
See application file for complete search history.

(56) References Cited

U.S. PATENT DOCUMENTS

| | | | | |
|---|---|---|---|---|
| 4,571,746 | A * | 2/1986 | Gorike | H04R 5/0335 D29/112 |
| 5,469,505 | A * | 11/1995 | Gattey | H04M 1/05 D14/206 |
| 9,113,255 | B2 * | 8/2015 | Araki | H04R 1/1091 |
| 9,723,392 | B2 * | 8/2017 | Taylor | H04R 1/1066 |
| 10,715,900 | B2 * | 7/2020 | Duckwall | H04R 1/2857 |
| 11,102,567 | B2 * | 8/2021 | Leclerc | H04R 1/105 |
| 11,457,300 | B2 * | 9/2022 | Hatfield | H04R 1/105 |
| 12,155,987 | B2 * | 11/2024 | Lowson | H04R 1/1008 |

(Continued)

FOREIGN PATENT DOCUMENTS

| | | | | |
|---|---|---|---|---|
| CN | 106358106 | A * | 1/2017 | ............. H04R 1/105 |
| CN | 114598960 | A * | 6/2022 | |

(Continued)

*Primary Examiner* — Ryan Robinson
(74) *Attorney, Agent, or Firm* — Cheng-Ju Chiang

(57) ABSTRACT

A telescopic structure of a headphone includes a headband, a cover, a slider, two damping elements and a cable. A front end of an inner surface of the headband defines a first concave surface. The cover is disposed to the front end of the inner surface of the headband. A front end of an internal surface of the cover is recessed inward to form a second concave surface. The second concave surface is corresponding to the first concave surface. The slider is disposed between the headband and the cover. The two damping elements are disposed to the first concave surface and the second concave surface, respectively. The two damping elements abut against two opposite areas of an outer surface of the slider. The cable is disposed between the headband and the cover.

15 Claims, 8 Drawing Sheets

(56) References Cited

U.S. PATENT DOCUMENTS

| | | | | |
|---|---|---|---|---|
| 2011/0044463 A1* | 2/2011 | DiRusso | .............. | H04R 5/0335 |
| | | | | 381/378 |
| 2012/0140973 A1* | 6/2012 | Olodort | ................ | H04R 1/1066 |
| | | | | 381/375 |
| 2016/0295313 A1* | 10/2016 | Martin | .................. | H04R 1/1041 |

FOREIGN PATENT DOCUMENTS

| | | | | | |
|---|---|---|---|---|---|
| CN | 111385692 B | * | 11/2022 | ........... | H04R 1/1008 |
| JP | 2009105554 A | * | 5/2009 | ........... | H04R 5/0335 |
| TW | M456656 U | * | 7/2013 | | |
| WO | WO-2015087431 A1 | * | 6/2015 | ........... | H04R 1/1033 |

\* cited by examiner

TELESCOPIC STRUCTURE OF HEADPHONE

CROSS-REFERENCE TO RELATED APPLICATION

The present application is based on, and claims priority from, China Patent Application No. 202223136504.5, filed Nov. 25, 2022, the disclosure of which is hereby incorporated by reference herein in its entirety.

BACKGROUND OF THE INVENTION

1. Field of the Invention

The present invention generally relates to a headphone, and more particularly to a telescopic structure of a headphone having a simplified structure, a lower cost and a better hand feeling in use.

2. The Related Art

Generally, current earphones are various types. The current earphones include earbuds, in-ear earphones, headphones, etc. Compare the headphone with other earphones, the headphone is able to cover a user's ear completely to make a wearing feeling of the headphone more comfortable. A purpose of adjusting a length of a head band is achieved by adjusting a structure of the head band so as to satisfy requirements of different users.

A conventional headphone includes a left earphone assembly, a right earphone assembly, and a telescopic damping structure disposed between the left earphone assembly and the right earphone assembly. The telescopic damping structure has a headset connector and a sliding arm. The headset connector has a connector body. The connector body is a hollow structure. The sliding arm has a sliding arm body. The sliding arm body is a columnar structure. An outer surface of a top end of the sliding arm body is sleeved by an upper damping ring. The top end of the sliding arm body is slidably connected with an inner wall of the connector body by the upper damping ring. An inner surface of a bottom end of the connector body is equipped with a lower damping ring. An outer wall of the sliding arm body is slidably connected with the inner surface of the bottom end of connector body by the lower damping ring.

However, the above-mentioned upper damping ring and the lower damping ring of the conventional headphone are disposed to two assembly grooves of the sliding arm body, respectively, so that positions of the upper damping ring and the lower damping ring are limited. Two plastic rings are mounted around two opposite ends of the sliding arm body, respectively. The two plastic rings are used for reinforcing a connection between the sliding arm body and the connector body to prevent the two plastic rings from sliding. The two plastic rings are disposed to an outer surface of the upper damping ring and an outer surface of the lower damping ring. As a result, the above-mentioned headphone has a higher cost of a damping sliding effect, and a structure of the above-mentioned headphone is relatively complicated.

Thus, it is essential to provide an innovative telescopic structure of a headphone having a simplified structure, a lower cost and a better hand feeling in use.

SUMMARY OF THE INVENTION

An object of the present invention is to provide a telescopic structure of a headphone having a simplified structure, a lower cost and a better hand feeling in use. The telescopic structure of the headphone includes a headband, a cover, a slider, two damping elements and a cable. A front end of an inner surface of the headband defines a first concave surface. A front end of the headband defines a receiving chamber. The first concave surface is located in front of the receiving chamber. The cover is disposed to the front end of the inner surface of the headband. A front end of an internal surface of the cover is recessed inward to form a second concave surface. The second concave surface is corresponding to the first concave surface. The slider is disposed between the headband and the cover. The two damping elements are disposed to the first concave surface and the second concave surface, respectively. The two damping elements abut against two opposite areas of an outer surface of the slider. The cable is disposed between the headband and the cover. One end of the cable penetrates through one end of the slider and then extends out of the other end the slider. One part of the cable is bent continuously to form a bending structure. The bending structure is disposed in the receiving chamber.

Another object of the present invention is to provide a telescopic structure of a headphone. The telescopic structure of the headphone includes a headband, a cover, a slider and two damping elements. A front end of an inner surface of the headband defines a first concave surface and a plurality of ribs. Each rib extends along a lengthwise direction of the headband. The first concave surface and the plurality of the ribs are sequentially arranged along the lengthwise direction of the headband. The cover is disposed to the front end of the inner surface of the headband. The cover covers the plurality of the ribs and the first concave surface. A front end of an internal surface of the cover is recessed inward to form a second concave surface. The front end of the internal surface of the cover extends downward to form a restricting block. The second concave surface and the restricting block are sequentially disposed along a lengthwise direction of the cover. The second concave surface is corresponding to the first concave surface. The slider is disposed between the headband and the cover. The slider has a main body, a gliding groove and a protruding block. The protruding block and the gliding groove are located at two opposite surfaces of the main body, respectively. The protruding block abuts against the plurality of the ribs. The restricting block abuts against a front end wall or a rear end wall of the gliding groove. The two damping elements are disposed to the first concave surface and the second concave surface, respectively. The two damping elements abut against the two opposite surfaces of the main body of the slider.

Another object of the present invention is to provide a telescopic structure of a headphone. The telescopic structure of the headphone includes a headband, a cover, a slider and two damping elements. A front end of an inner surface of the headband defines a first concave surface and a plurality of ribs. The plurality of the ribs are arranged transversely. Each rib extends along a lengthwise direction of the headband. The first concave surface is located in front of the plurality of the ribs. The cover is disposed to the front end of the inner surface of the headband. The cover covers the plurality of the ribs and the first concave surface. A front end of an internal surface of the cover is recessed inward to form a second concave surface. A rear end of the internal surface of the cover extends downward to form a stopping block. The front end of the internal surface of the cover extends downward to form a restricting block. The second concave surface is disposed at a front end of the restricting block. The second concave surface is corresponding to the first concave surface. The slider is disposed between the headband and the cover. The slider has a main body. An upper portion of a rear end of the main body extends rearward to form a protruding portion. A bottom surface of the main body extends downward to form a protruding block. The main body defines a gliding groove penetrating through a top surface of the main body. A rear end of the gliding groove is connected with the protruding portion. The protruding portion is slidably disposed between the stopping block and the restricting block. The restricting block is slidably disposed in the gliding groove. The protruding block and the gliding groove are located at the bottom surface and the top surface of the main body, respectively. The protruding block abuts against the plurality of the ribs. The two damping elements are disposed to the first concave surface and the second concave surface, respectively. The two damping elements abut against the top surface and the bottom surface of the main body of the slider. When the telescopic structure of the headphone is retracted, the restricting block abuts against a front end wall of the gliding groove. When the telescopic structure of the headphone completely extends outward, the restricting block abuts against a rear end wall of the gliding groove.

As described above, the two damping elements are disposed to the first concave surface of the headband and the second concave surface of the cover of the telescopic structure of the headphone, respectively. The two damping elements abut against the two opposite surfaces of the main body of the slider, the two damping elements are interfered with the main body of the slider, and the two damping elements are cooperated with the main body of the slider. A comfortable feeling of adjusting a length of the telescopic structure of the headphone is increased by a damping sliding way. The one part of the cable is bent continuously to form the bending structure for saving more internal structure space to be beneficial for a production and a manufacture of the telescopic structure of the headphone. As a result, the telescopic structure of the headphone has a simplified structure, a lower cost and a better hand feeling in use.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
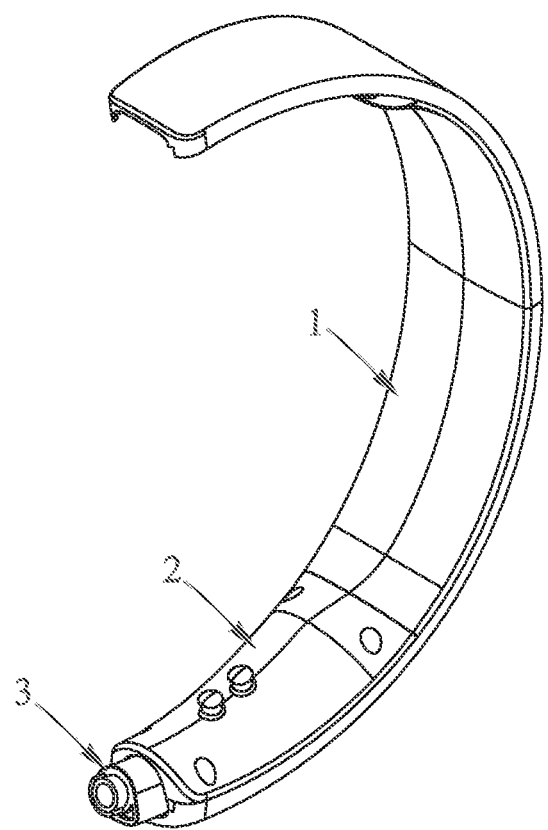
FIG. 1 is a perspective view of a telescopic structure of a headphone in accordance with a preferred embodiment of the present invention, wherein the telescopic structure of the headphone is in a retracted status.

With reference to FIG. 1 to FIG. 4, a telescopic structure of a headphone 100 in accordance with a preferred embodiment of the present invention is shown. The telescopic structure of the headphone 100 includes a headband 1, a cover 2, a slider 3, a damping element 4 and a cable 5. In the preferred embodiment, the telescopic structure of the headphone 100 includes two damping elements 4.

The cover 2 is disposed to a front end of an inner surface 104 of the headband 1. The cover 2 is covered to the front end of the inner surface 104 of the headband 1. The slider 3 is disposed between the headband 1 and the cover 2. The slider 3 is movable with respect to the headband 1 and the cover 2. The slider 3 is used for adjusting a length of the telescopic structure of the headphone 100. The two damping elements 4 are arched oppositely. The damping element 4 is disposed to the inner surface 104 of the headband 1 and an internal surface 201 of the cover 2. The two damping elements 4 are disposed to the inner surface 104 of the headband 1 and the internal surface 201 of the cover 2, respectively. The damping element 4 abuts against an outer surface of the slider 3. The two damping elements 4 abut against two opposite areas of the outer surface of the slider 3.

The slider 3 is disposed between the inner surface 104 of the headband 1 and the internal surface 201 of the cover 2. Each damping element 4 is interfered with the slider 3. Each damping element 4 is cooperated with the slider 3. The two damping elements 4 are interfered with the outer surface of the slider 3. The two damping elements 4 are interfered with the outer surface of the slider 3. A comfortable feeling of adjusting the length of the telescopic structure of the headphone 100 is increased by a damping sliding way. The damping sliding way is that the two damping elements 4 rub against the slider 3. In the preferred embodiment, each damping element 4 is a rubber. In a concrete implementation, the damping element 4 is without being limited to be the rubber.

The cable 5 is disposed between the headband 1 and the cover 2. One end of the cable 5 penetrates through one end of the slider 3 and then extends out of the other end the slider 3. The one end of the cable 5 penetrates through an inner end of the slider 3 and then extends out of an outer end of the slider 3. In the preferred embodiment, one part of the cable 5 is mounted in the headband 1, and the other part of the cable 5 extends outward through the slider 3. In the preferred embodiment, the one part of the cable 5 is bent continuously to form a bending structure 51. When the slider 3 extends out of the headband 1 and the cover 2, the bending structure 51 is stretched together with the slider 3, and the bending structure 51 is straightened. When the slider 3 is retracted into the headband 1 and the cover 2, the bending structure 51 is restored to a bending state by an elastic resilience of the bending structure 51 of the cable 5. The bending structure 51 saves more internal structure space to be beneficial for a production and a manufacture of the telescopic structure of the headphone 100.

Figure 2:
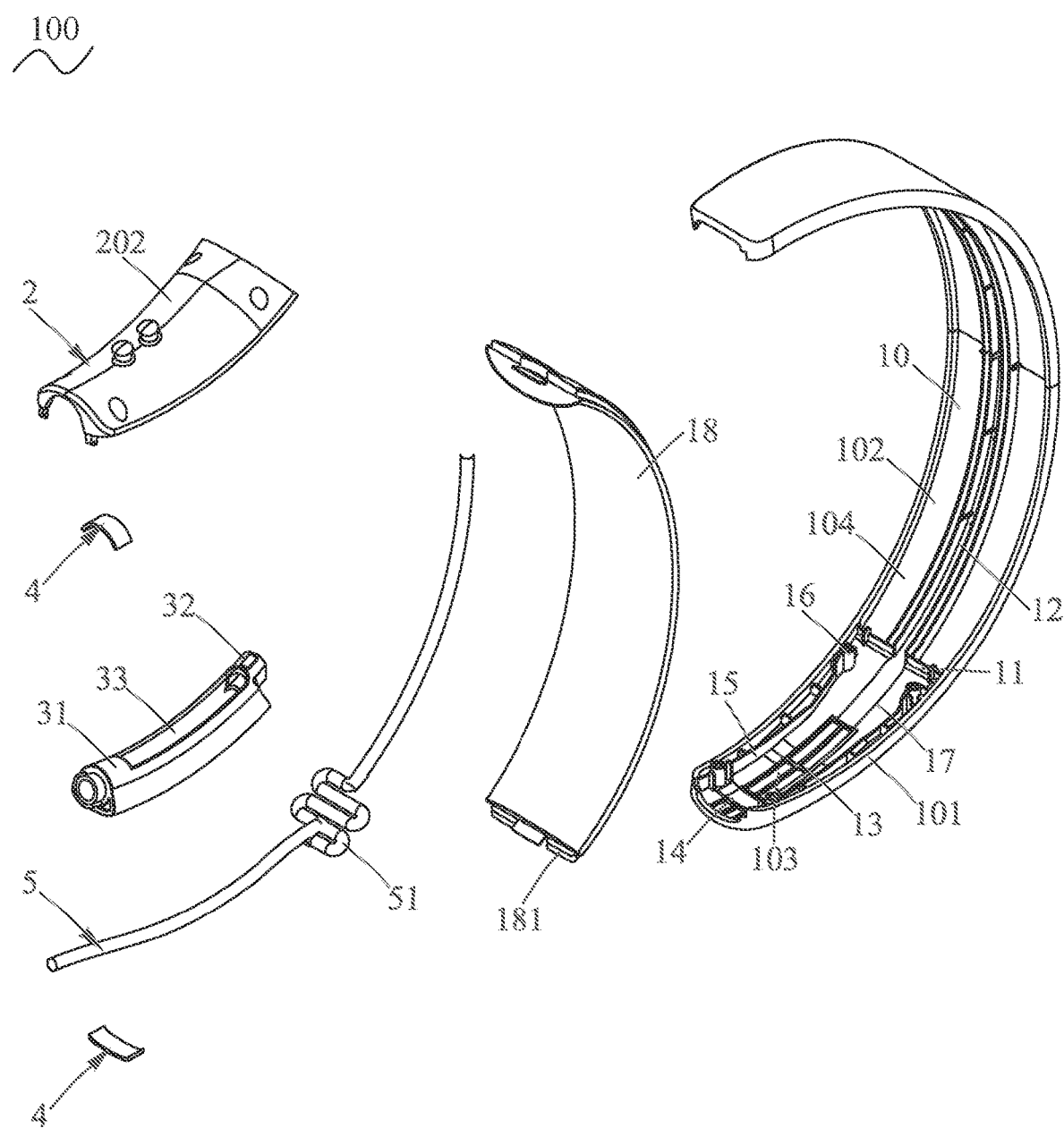
FIG. 2 is an exploded view of the telescopic structure of the headphone of FIG. 1.

Referring to FIG. 2, the headband 1 is an arc shape. The headband 1 has a main portion 10, a stopping portion 11, a wire groove 12, a plurality of ribs 13, a first concave surface 14, two side walls 15, a plurality of locating pillars 16, a receiving chamber 17 and a protective pad 18. The inner surface 104 of the headband 1 extends upward to form the stopping portion 11. The main portion 10 is divided into a front portion 101 and a middle portion 102 by the stopping portion 11. The front portion 101 is located in front of the stopping portion 11. The middle portion 102 is located behind the stopping portion 11. The cover 2 and the slider 3 are disposed to the front portion 101. A rear end of the cover 2 is corresponding to the stopping portion 11. The front end of the inner surface 104 of the headband 1 defines the first concave surface 14 and the plurality of the ribs 13. The plurality of the ribs 13 are arranged transversely. A front end of the headband 1 defines the receiving chamber 17. The first concave surface 14 is located in front of the receiving chamber 17.

An inner surface of the middle portion 102 of the main portion 10 of the headband 1 forms the wire groove 12. The wire groove 12 extends along a lengthwise direction of the main portion 10. The wire groove 12 is shown as the arc shape. The wire groove 12 penetrates through a middle of the stopping portion 11. Two opposite lateral walls of the wire groove 12 are connected with two opposite sides of the stopping portion 11. One end of the wire groove 12 is communicated with the middle of the stopping portion 11. The one end of the wire groove 12 is communicated with an inside of the front portion 101 through the middle of the stopping portion 11. The cable 5 is partially mounted in the wire groove 12.

Several portions of a middle of an inner surface of the front portion 101 of the headband 1 extend upward to form the plurality of the ribs 13 arranged transversely. Each rib 13 extends along the lengthwise direction of the main portion 10 of the headband 1. The slider 3 moves frontward or rearward on the plurality of the ribs 13. A front end of the inner surface of the front portion 101 of the headband 1 is recessed downward to form the first concave surface 14. The first concave surface 14 and the plurality of the ribs 13 are sequentially arranged along the lengthwise direction of the main portion 10 of the headband 1. One damping element 4 is positioned in the first concave surface 14. The first concave surface 14 is located in front of the plurality of the ribs 13. Two opposite sides of the inner surface of the front portion 101 of the headband 1 extend upward to form the two side walls 15, respectively. Each side wall 15 is arranged along the lengthwise direction of the main portion 10. The plurality of the ribs 13 are disposed between the two side walls 15. The slider 3 is disposed between the two side walls 15.

Several portions of the front end and a rear end of the inner surface of the front portion 101 of the headband 1 extend upward to form the plurality of the locating pillars 16. The two side walls 15 are disposed between the locating pillars 16 of the front end and the rear end of the inner surface of the front portion 101. The plurality of the locating pillars 16 are corresponding to a corresponding mechanism of the cover 2. A plurality of screws (not shown) are fastened in the plurality of the locating pillars 16 and the corresponding mechanism of the cover 2 to realize that the cover 2 is located to the headband 1, and the cover 2 is fixed to the headband 1.

A middle of the rear end of the front portion 101 of the headband 1 has the receiving chamber 17. The receiving chamber 17 is formed among the inner surface of the main portion 10, a front end of the stopping portion 11 and rear ends of the plurality of the ribs 13. The receiving chamber 17 receives the bending structure 51 of the cable 5 to save the internal structure space of the headband 1. The bending structure 51 is disposed in the receiving chamber 17. The protective pad 18 is disposed to the middle portion 102, and the protective pad 18 covers the wire groove 12 and the inner surface of the main portion 10. Two opposite sides of a tail end of the protective pad 18 extend outward to form two locating plates 181, respectively. The two locating plates 181 abut against the two opposite sides of the stopping portion 11 to realize that the protective pad 18 is located to the stopping portion 11 of the headband 1.

Figure 3:
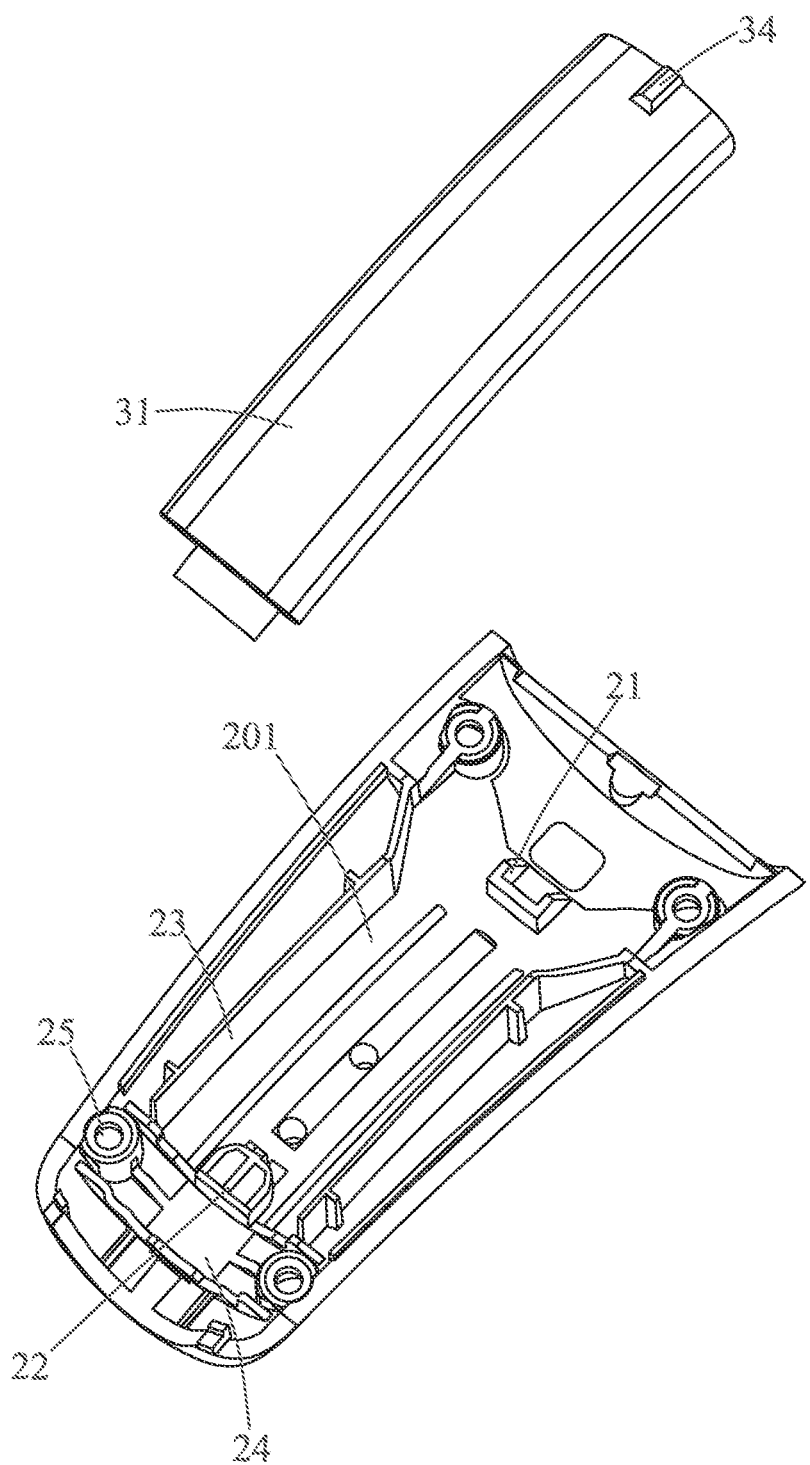
FIG. 3 is a partially exploded view of the telescopic structure of the headphone of FIG. 1.
Figure 4:
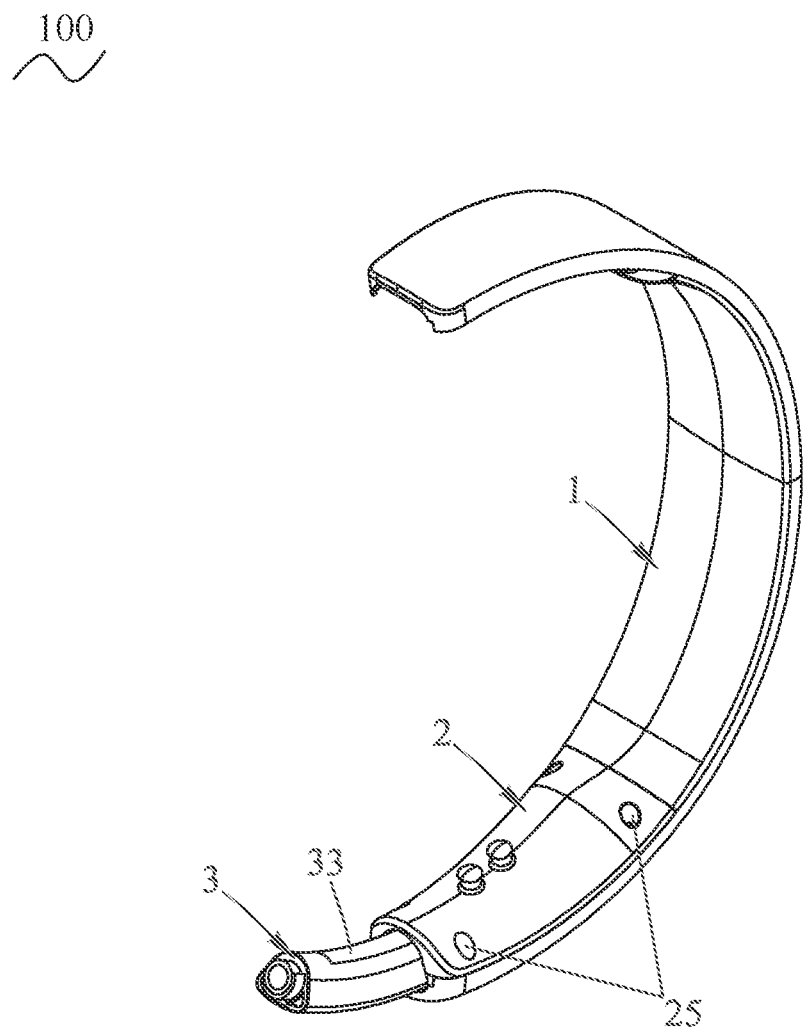
FIG. 4 is another perspective view of the telescopic structure of the headphone of FIG. 1, wherein the telescopic structure of the headphone is in an expanded status.
Figure 5:
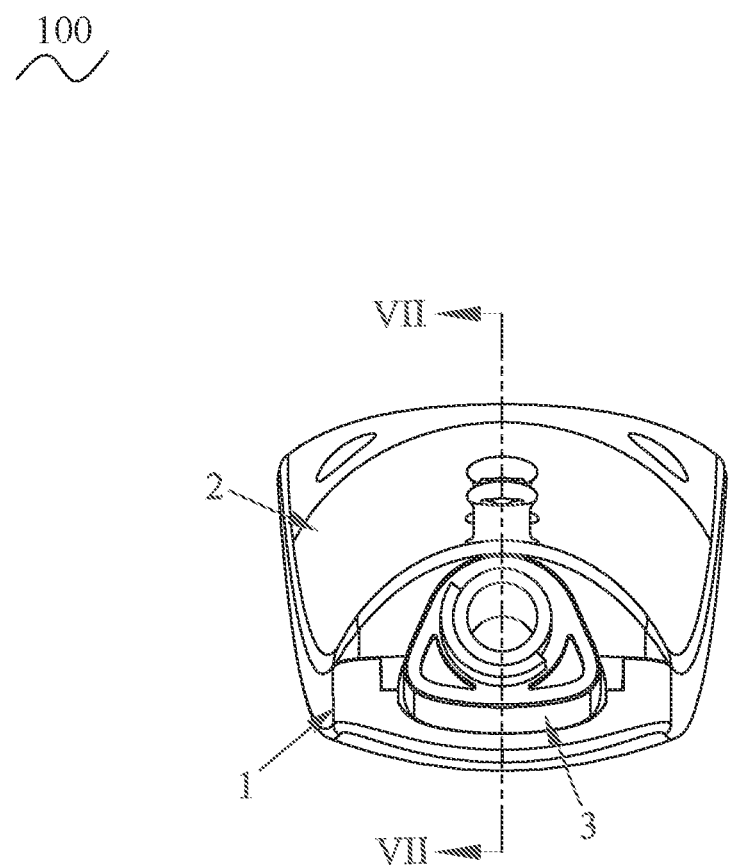
FIG. 5 is a diagrammatic drawing of the telescopic structure of the headphone of FIG. 1, wherein the telescopic structure of the headphone is in the retracted status.
Figure 6:
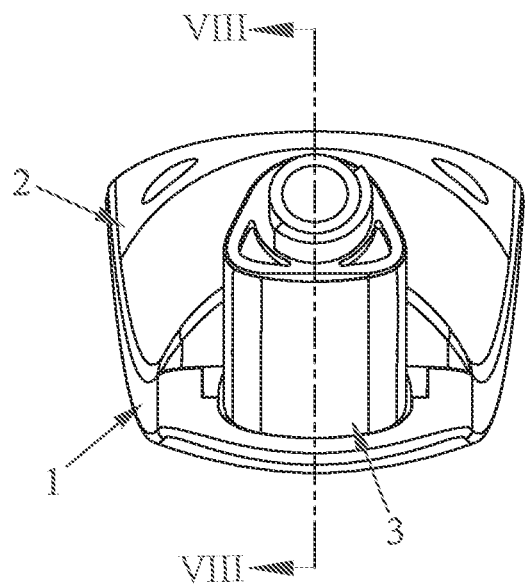
FIG. 6 is another diagrammatic drawing of the telescopic structure of the headphone of FIG. 1, wherein the telescopic structure of the headphone is in the expanded status.
Figure 7:
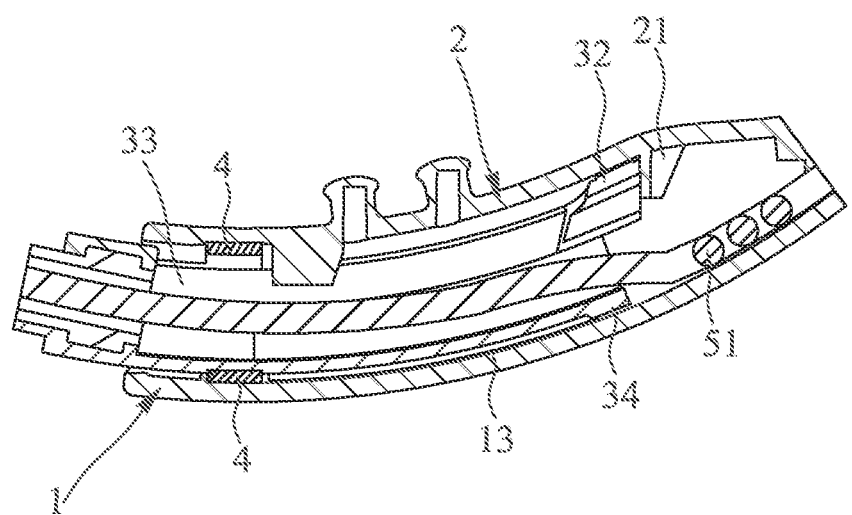
FIG. 7 is a sectional view of the telescopic structure of the headphone along a line VII-VII of FIG. 5.
Figure 8:
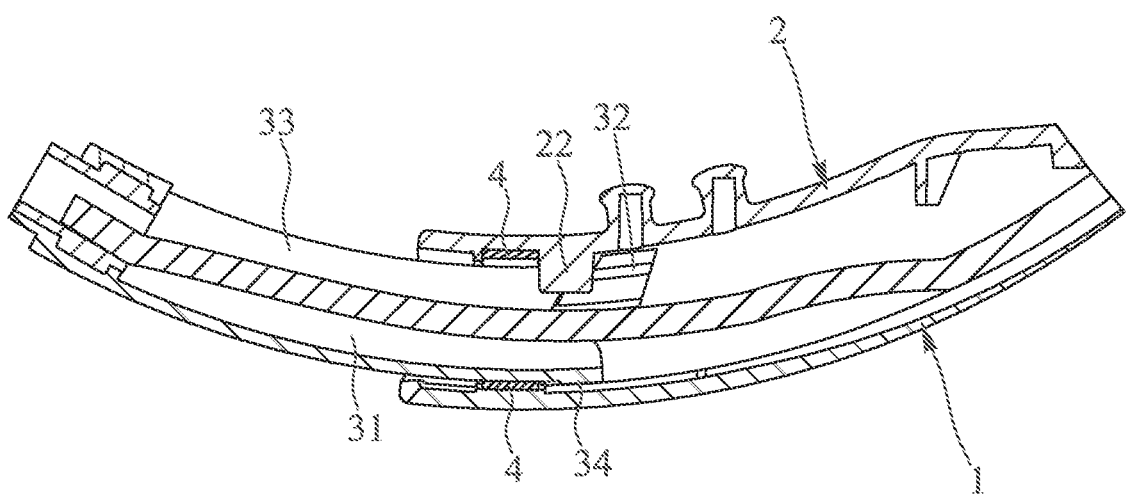
FIG. 8 is a sectional view of the telescopic structure of the headphone along a line VIII-VIII of FIG. 6.

Referring to FIG. 1 to FIG. 3, the cover 2 is disposed to the front portion 101 of the headband 1. The cover 2 covers the stopping portion 11, the plurality of the ribs 13, the first concave surface 14, the two side walls 15, the plurality of the locating pillars 16 and the receiving chamber 17. The cover 2 has a stopping block 21, a restricting block 22, two stopping walls 23, a second concave surface 24 and a plurality of locating holes 25. A rear end of the internal surface 201 of the cover 2 extends downward and towards the inner surface of the front portion 101 to form the stopping block 21. A corresponding mechanism of the slider 3 abuts against the stopping block 21 to realize that the cover 2 is located to the slider 3, and the cover 2 is fastened to the slider 3. A front end of the internal surface 201 of the cover 2 extends downward and towards the inner surface of the front portion 101 to form the restricting block 22. The second concave surface 24 and the restricting block 22 are sequentially disposed along a lengthwise direction of the cover 2. A corresponding position of the slider 3 abuts against the restricting block 22 to realize that the cover 2 is located to the slider 3, and the cover 2 is fastened to the slider 3. The restricting block 22 is located in front of the stopping block 21. The second concave surface 24, the restricting block 22 and the stopping block 21 are sequentially disposed along the lengthwise direction of the cover 2.

Two opposite sides of the internal surface 201 of the cover 2 extend downward to form the two stopping walls 23, respectively. The two stopping walls 23 are arranged transversely. Each stopping wall 23 extends along a lengthwise direction of the cover 2. The two stopping walls 23 are disposed between the two side walls 15 of the headband 1. The plurality of the ribs 13 are disposed between the two stopping walls 23. The slider 3 is disposed between the two stopping walls 23. The stopping block 21 is located at a rear end of an interval which is defined between the two stopping walls 23. The restricting block 22 is located at a front end of the interval which is defined between the two stopping walls 23.

In the preferred embodiment, inner surfaces of the stopping block 21 and the restricting block 22 are smoothly transited. The front end of the internal surface 201 of the cover 2 is recessed inward to form the second concave surface 24. The second concave surface 24 is disposed at a front end of the restricting block 22. The restricting block 22 is disposed between the stopping block 21 and the second concave surface 24. The other damping element 4 is positioned in the second concave surface 24. The position of the second concave surface 24 is corresponding to the position of the first concave surface 14 of the headband 1. The two damping elements 4 are positioned in the first concave surface 14 and the second concave surface 24, respectively. The two damping elements 4 are corresponding to each other. The plurality of the locating holes 25 penetrate through a front end and a rear end of an external surface 202 and the front end and the rear end of the internal surface 201 of the cover 2. Each locating hole 25 is corresponding to one locating pillar 16 of the headband 1. The plurality of the screws (not shown) pass through the plurality of the locating holes 25, and then the plurality of the locating holes 25 are fastened in the plurality of the locating pillars 16 of the headband 1 to realize that the cover 2 is located to the headband 1, and the cover 2 is fastened to the headband 1.

Referring to FIG. 2 and FIG. 3, the slider 3 is disposed in the front portion 101 of the headband 1. The cover 2 is covered on the front portion 101 of the headband 1 to form an accommodating space 103 between the cover 2 and the front portion 101 of the headband 1. The slider 3 is accommodated in the accommodating space 103. The slider 3 has a main body 31, a protruding portion 32, a gliding groove 33 and a protruding block 34. The main body 31 is disposed between the two stopping walls 23 of the cover 2. The main body 31 is disposed in the accommodating space 103. The two damping elements 4 abut against two opposite surfaces of the main body 31 of the slider 3.

Referring to FIG. 2 to FIG. 3, an upper portion of a rear end of the main body 31 extends rearward to form the protruding portion 32. The protruding portion 32 slides between two facing surfaces of the stopping block 21 and the restricting block 22 along the lengthwise direction of the cover 2. The protruding portion 32 is slidably disposed between the stopping block 21 and the restricting block 22. When the slider 3 is retracted into the accommodating space 103, the protruding portion 32 abuts against the inner surface of the stopping block 21 of the cover 2. When the slider 3 extends out of the accommodating space 103, the protruding portion 32 abuts against the inner surface of the restricting block 22 of cover 2. In the preferred embodiment, when the telescopic structure of the headphone 100 is retracted, the protruding portion 32 abuts against the inner surface of the stopping block 21 of the cover 2. When the telescopic structure of the headphone 100 extends outward to a longest length, the protruding portion 32 abuts against the inner surface of the restricting block 22 of cover 2.

Referring to FIG. 1 to FIG. 8, the main body 31 defines a gliding groove 33 penetrating through a top surface of the main body 31. The gliding groove 33 extends along a lengthwise direction of the main body 31. The restricting block 22 of the cover 2 is slidably disposed in the gliding groove 33. The restricting block 22 of the cover 2 abuts against a front end wall or a rear end wall of the gliding groove 33. When the telescopic structure of the headphone 100 is retracted, the restricting block 22 of the cover 2 abuts against the front end wall of the gliding groove 33. When the telescopic structure of the headphone 100 extends outward, the restricting block 22 of the cover 2 slides in the gliding groove 33. When the telescopic structure of the headphone 100 completely extends outward to the longest length, the restricting block 22 of the cover 2 abuts against the rear end wall of the gliding groove 33. A rear end of the gliding groove 33 extends to the protruding portion 32. The rear end of the gliding groove 33 is connected with the protruding portion 32. The protruding portion 32 is disposed to the rear end of the gliding groove 33. When the telescopic structure of the headphone 100 extends outward to the longest length, the restricting block 22 of the cover 2 is located at the rear end of the gliding groove 33, and the restricting block 22 of the cover 2 abuts against the protruding portion 32 simultaneously.

A bottom surface of the main body 31 extends downward to form the protruding block 34. The protruding block 34 is formed at a bottom surface of a rear end of the slider 3. The protruding block 34 and the gliding groove 33 are located at the two opposite surfaces of the main body 31 of the slider 3, respectively. The protruding block 34 and the gliding groove 33 are located at the bottom surface and the top surface of the main body 31, respectively. The two damping elements 4 abut against the top surface and the bottom surface of the main body 31 of the slider 3. The protruding block 34 contacts with the plurality of the ribs 13 of the headband 1. The protruding block 34 abuts against the plurality of the ribs 13. The protruding block 34 alternately abuts against front ends and rear ends of the plurality of the ribs 13 of the headband 1. When the telescopic structure of the headphone 100 is retracted, the protruding block 34 abuts against the rear ends of the plurality of the ribs 13 of the headband 1. When the telescopic structure of the headphone 100 extends outward, the protruding block 34 moves frontward along the plurality of the ribs 13 of the headband 1. When the telescopic structure of the headphone 100 extends outward to the longest length, the protruding block 34 abuts against the front ends of the plurality of the ribs 13 of the headband 1, so that the slider 3 is located.

The two damping elements 4 are fastened in the first concave surface 14 of the headband 1 and the second concave surface 24 of the cover 2, respectively. The two damping elements 4 abut against the two opposite surfaces of the main body 31 of the slider 3, and the two damping elements 4 are interfered with the main body 31 of the slider 3. The comfortable feeling of adjusting the length of the telescopic structure of the headphone 100 is increased by the damping sliding way.

As described above, the two damping elements 4 are disposed to the first concave surface 14 of the headband 1 and the second concave surface 24 of the cover 2 of the telescopic structure of the headphone 100, respectively. The two damping elements 4 abut against the two opposite surfaces of the main body 31 of the slider 3, the two damping elements 4 are interfered with the main body 31 of the slider 3, and the two damping elements 4 are cooperated with the main body 31 of the slider 3. The comfortable feeling of adjusting the length of the telescopic structure of the headphone 100 is increased by the damping sliding way. The one part of the cable 5 is bent continuously to form the bending structure 51 for saving more internal structure space to be beneficial for a production and a manufacture of the telescopic structure of the headphone 100. As a result, the telescopic structure of the headphone 100 has a simplified structure, a lower cost and a better hand feeling in use.

What is claimed is:

1. A telescopic structure of a headphone, comprising:
a headband, a front end of an inner surface of the headband defining a first concave surface, a front end of the headband defining a receiving chamber, the first concave surface being located in front of the receiving chamber;
a cover disposed to the front end of the inner surface of the headband, a front end of an internal surface of the cover being recessed inward to form a second concave surface, the second concave surface being corresponding to the first concave surface;
a slider disposed between the headband and the cover;
two damping elements disposed to the first concave surface and the second concave surface, respectively, the two damping elements abutting against two opposite areas of an outer surface of the slider; and
a cable disposed between the headband and the cover, one end of the cable penetrating through one end of the slider and then extending out of the other end the slider, one part of the cable being bent continuously to form a bending structure, the bending structure being disposed in the receiving chamber.

2. The telescopic structure of the headphone as claimed in claim 1, wherein the inner surface of the headband extends upward to form a stopping portion, the headband has a main portion, the main portion is divided into a front portion and a middle portion by the stopping portion, the front portion is located in front of the stopping portion, the middle portion is located behind the stopping portion, the cover and the slider are disposed to the front portion, a rear end of the cover is corresponding to the stopping portion, a front end of an inner surface of the front portion of the headband is recessed downward to form the first concave surface, a middle of a rear end of the front portion of the headband has the receiving chamber.

3. The telescopic structure of the headphone as claimed in claim 2, wherein an inner surface of the middle portion of the main portion of the headband forms a wire groove, the wire groove penetrates through a middle of the stopping portion, one end of the wire groove is communicated with the middle of the stopping portion, the cable is partially mounted in the wire groove.

4. The telescopic structure of the headphone as claimed in claim 2, wherein two opposite sides of the inner surface of the front portion of the headband extend upward to form two side walls, respectively, two opposite sides of the internal surface of the cover extend downward to form two stopping walls, respectively, the two stopping walls are disposed between the two side walls of the headband, the slider is disposed between the two stopping walls, the slider is disposed between the two side walls.

5. The telescopic structure of the headphone as claimed in claim 4, wherein several portions of a middle of the inner surface of the front portion of the headband extend upward to form a plurality of ribs arranged transversely, a rear end of the internal surface of the cover extends downward and towards the inner surface of the front portion to form a stopping block, the front end of the internal surface of the cover extends downward and towards the inner surface of the front portion to form a restricting block, the plurality of the ribs are disposed between the two stopping walls, the stopping block is located at a rear end of an interval which is defined between the two stopping walls, the restricting block is located at a front end of the interval which is defined between the two stopping walls.

6. The telescopic structure of the headphone as claimed in claim 5, wherein the receiving chamber is formed among an inner surface of the main portion, a front end of the stopping portion and rear ends of the plurality of the ribs.

7. The telescopic structure of the headphone as claimed in claim 5, wherein the slider has a main body, the two damping elements abut against two opposite surfaces of the main body, an upper portion of a rear end of the main body extends rearward to form a protruding portion, the protruding portion slides between two facing surfaces of the stopping block and the restricting block along a lengthwise direction of the cover.

8. The telescopic structure of the headphone as claimed in claim 7, wherein the main body defines a gliding groove penetrating through a top surface of the main body, the gliding groove extends along a lengthwise direction of the main body, the restricting block is slidably disposed in the gliding groove, a rear end of the gliding groove extends to the protruding portion, the rear end of the gliding groove is connected with the protruding portion.

9. The telescopic structure of the headphone as claimed in claim 8, wherein a bottom surface of the main body extends downward to form a protruding block, the protruding block and the gliding groove are located at the two opposite surfaces of the main body, respectively, the protruding block abuts against the plurality of the ribs, the first concave surface is located in front of the plurality of the ribs.

10. The telescopic structure of the headphone as claimed in claim 4, wherein several portions of the front end and a rear end of the inner surface of the front portion of the headband extend upward to form a plurality of locating pillars, the two side walls are disposed between the locating pillars of the front end and the rear end of the inner surface of the front portion.

11. The telescopic structure of the headphone as claimed in claim 10, wherein the cover has a plurality of locating holes, the plurality of the locating holes penetrate through a front end and a rear end of an external surface and the front end and a rear end of the internal surface of the cover, each locating hole is corresponding to one locating pillar.

12. A telescopic structure of a headphone, comprising:
   a headband, a front end of an inner surface of the headband defining a first concave surface and a plurality of ribs, each rib extending along a lengthwise direction of the headband, the first concave surface and the plurality of the ribs being sequentially arranged along the lengthwise direction of the headband;
   a cover disposed to the front end of the inner surface of the headband, the cover covering the plurality of the ribs and the first concave surface, a front end of an internal surface of the cover being recessed inward to form a second concave surface, the front end of the internal surface of the cover extending downward to form a restricting block, the second concave surface and the restricting block being sequentially disposed along a lengthwise direction of the cover, the second concave surface being corresponding to the first concave surface;
   a slider disposed between the headband and the cover, the slider having a main body, a gliding groove and a protruding block, the protruding block and the gliding groove being located at two opposite surfaces of the main body, respectively, the protruding block abutting against the plurality of the ribs, the restricting block abutting against a front end wall or a rear end wall of the gliding groove; and
   two damping elements disposed to the first concave surface and the second concave surface, respectively, the two damping elements abutting against the two opposite surfaces of the main body of the slider.

13. The telescopic structure of the headphone as claimed in claim 12, wherein an upper portion of a rear end of the main body extends rearward to form a protruding portion, the inner surface of the headband extends upward to form a stopping portion, the headband has a main portion, the main portion is divided into a front portion and a middle portion by the stopping portion, a rear end of the internal surface of the cover extends downward and towards an inner surface of the front portion to form a stopping block, the protruding portion abuts against the stopping block.

14. The telescopic structure of the headphone as claimed in claim 13, wherein the second concave surface, the restricting block and the stopping block are sequentially disposed along the lengthwise direction of the cover, the restricting block is disposed between the stopping block and the second concave surface, the second concave surface is disposed at a front end of the restricting block, the restricting block is located in front of the stopping block, the first concave surface is located in front of the plurality of the ribs, the protruding portion is disposed to a rear end of the gliding groove, the protruding block is formed at a bottom surface of a rear end of the slider.

15. A telescopic structure of a headphone, comprising:
   a headband, a front end of an inner surface of the headband defining a first concave surface and a plurality of ribs, the plurality of the ribs being arranged transversely, each rib extending along a lengthwise direction of the headband, the first concave surface being located in front of the plurality of the ribs;

a cover disposed to the front end of the inner surface of the headband, the cover covering the plurality of the ribs and the first concave surface, a front end of an internal surface of the cover being recessed inward to form a second concave surface, a rear end of the internal surface of the cover extending downward to form a stopping block, the front end of the internal surface of the cover extending downward to form a restricting block, the second concave surface being disposed at a front end of the restricting block, the second concave surface being corresponding to the first concave surface;

a slider disposed between the headband and the cover, the slider having a main body, an upper portion of a rear end of the main body extending rearward to form a protruding portion, a bottom surface of the main body extending downward to form a protruding block, the main body defining a gliding groove penetrating through a top surface of the main body, a rear end of the gliding groove being connected with the protruding portion, the protruding portion being slidably disposed between the stopping block and the restricting block, the restricting block being slidably disposed in the gliding groove, the protruding block and the gliding groove being located at the bottom surface and the top surface of the main body, respectively, the protruding block abutting against the plurality of the ribs; and two damping elements disposed to the first concave surface and the second concave surface, respectively, the two damping elements abutting against the top surface and the bottom surface of the main body of the slider;

wherein when the telescopic structure of the headphone is retracted, the restricting block abuts against a front end wall of the gliding groove; and wherein when the telescopic structure of the headphone completely extends outward, the restricting block abuts against a rear end wall of the gliding groove.

* * * * *